United States Patent [19]
Reynolds

[11] Patent Number: 4,805,588
[45] Date of Patent: Feb. 21, 1989

[54] OVER AND UNDER RADIANT BROILER OVEN

[75] Inventor: Howard S. Reynolds, Tustin, Calif.

[73] Assignee: Connerton Appliance Company, Santa Ana, Calif.

[21] Appl. No.: 55,911

[22] Filed: Jun. 1, 1987

[51] Int. Cl.⁴ .............................................. F24C 5/00
[52] U.S. Cl. .................................. 126/51; 126/41 A; 126/41 B
[58] Field of Search ...................... 126/51, 41 B, 41 A; 431/326, 328, 268

[56] References Cited

U.S. PATENT DOCUMENTS

| | | | |
|---|---|---|---|
| 3,170,504 | 2/1965 | Lanning | 431/328 |
| 4,053,279 | 10/1977 | Eichenlaub | 126/85 R X |
| 4,591,333 | 5/1986 | Henke | 99/401 X |
| 4,607,609 | 8/1986 | Keating | 126/39 J |
| 4,634,373 | 1/1987 | Rattner | 126/92 AC X |

Primary Examiner—Larry Jones
Attorney, Agent, or Firm—William H. Maxwell

[57] ABSTRACT

An oven having at least one and preferably upper and lower burner radiants protected from food splatterings and drippings by transparent tiles coextensive with and separating the burner radiants from the oven chamber, the transparent tiles being of heat resistant material and spaced from the plane of the burner radiants to define a combustion plenum separate from the over chamber, all of which is vented through a flue, the food or the like being spaced within the over chamber on a rack for over and under, or surrounding, subjection to radiant heat in the infra-red range.

24 Claims, 2 Drawing Sheets

U.S. Patent   Feb. 21, 1989   Sheet 2 of 2   4,805,588
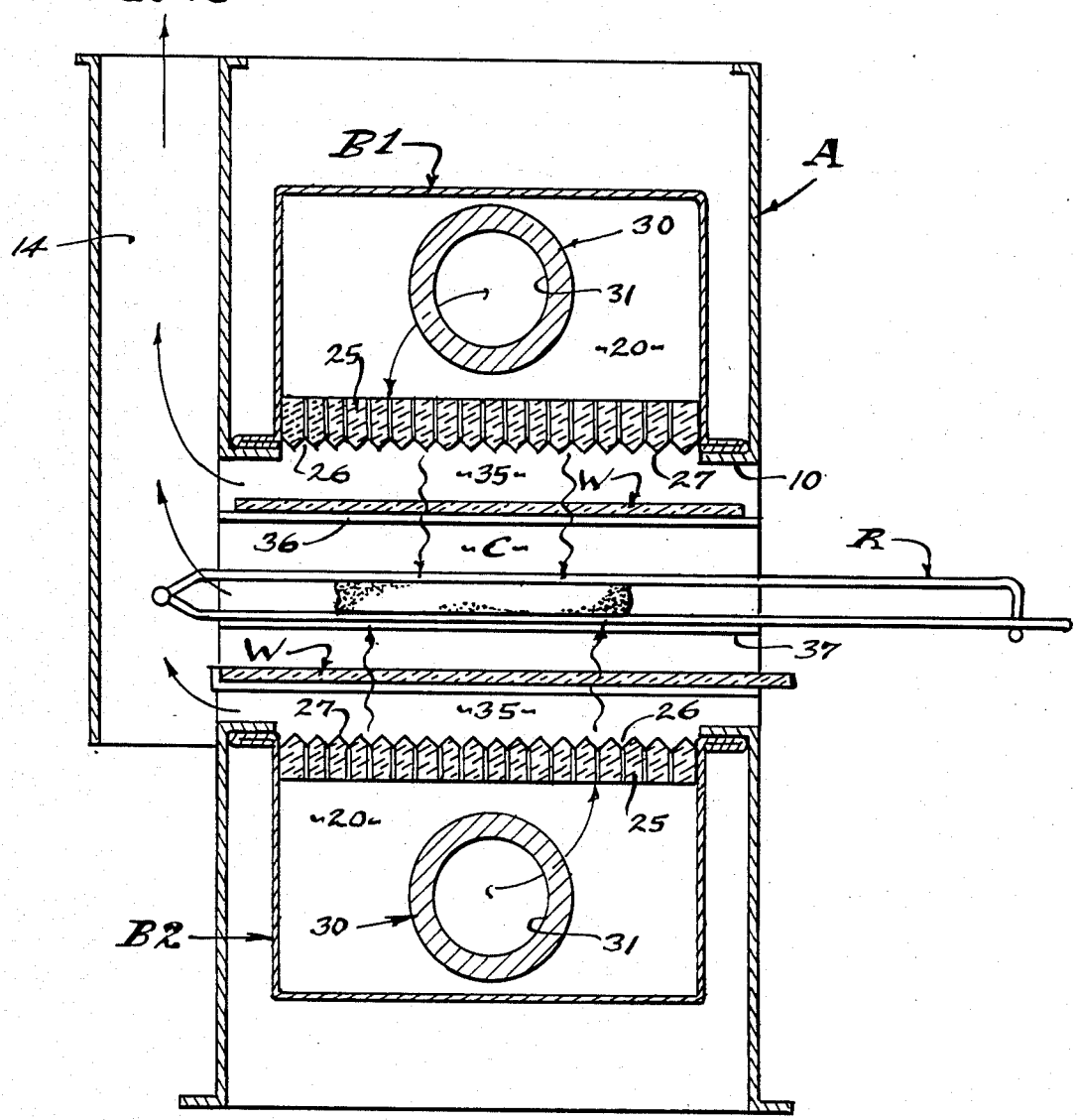
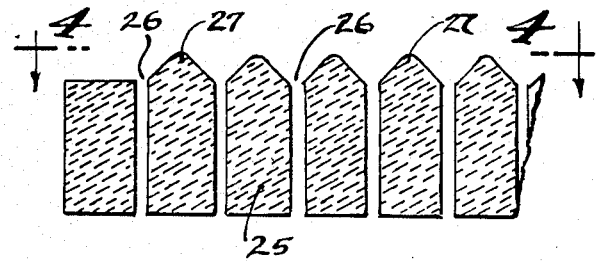
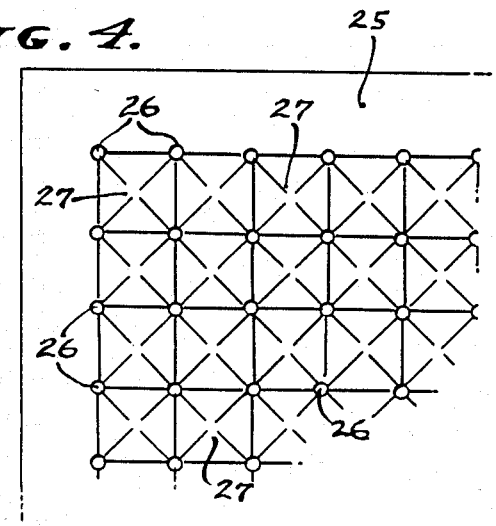

OVER AND UNDER RADIANT BROILER OVEN

BACKGROUND

This invention relates to gas fired broiler ovens for the cooking of foods, and is characterized by the use of direct radiation of heat into the food substance, as distinguished from conduction and/or convection heating. Another characteristic feature of this invention is the use of a transparent liner that transmits radiant heat and protects the gas fired radiant burners disposed both above and below the food substance. Accordingly, it is a general object of this invention to cooperatively employ gas fired radiants and protective transparent liners in an oven for food processing, and more particularly in a broiler oven that subjects food substance to both top and bottom radiant heat.

Heretofore, the gas burners of broilers have been exposed to drippings and splatterings, and the standard broiler has had an upper burner only, and a drip pan beneath a food supporting rack, whereby the upper face only of the food is subjected to the burner flames; which chars the food and requires a turn-over of the food in order to subject the other side thereof to the burner flame. It is an object of this invention to eliminate the subjection of foods to the burner flames, and to protect the burner (radiants) from food drippings and splatterings. Consequently, it now becomes a practicality with this invention to employ both top and bottom burners and particularly radiant burners of the type employed herein; in a broiler oven and in close proximity to the food being processed.

Gas fired burner radiants are widely used and are successful in many practical installations, where radiant heating is desired, as distinguished from conduction and convection heating. The advantage of radiant heating is that it is direct and usually more economical. However, such radiants are comprised of a multiplicity of very small combustion holes that are adversely affected by food drippings and splatterings. Consequently, gas fired burner radiants have not been successfully employed within broiler ovens and the like. However, radiants of the type under consideration reach a high surface temperature, they have a high rate of heat-up, as well as a fast cooldown rate, and their carbon monoxide (CO) emission is almost non-existant, while the products of combustion are $CO_2$ and $H_2O$. The great advantage of these radiants for food processing is that their surface temperature is coextensive of the radiant surface at a known value, of 800° F. to 1600° F., and the fact that the effect of the radiation travels at the speed of light and diminishes with the cosine of the angle to the plane of the radiant surface and at a rate determined by the square of the distance from said plane. This invention deals specifically with radiant infra-red light lying outside the visible spectrum at its red end; a thermal radiation of a wavelength longer than those of visible light. It is therefore an object of this invention to advantageously employ the light characteristics of infra-red heat radiation in a broiler oven by utilizing transparent walls or liners therein.

The interior walls of ovens and broilers have been glazed or porcelainized. However, glass per se has not been used as walls over and/or under gas burners in an oven or broiler to isolate the flames from the food. That is, the prior art broiler ovens do not protect the burners while permitting them to radiate heat. Consequently, the burners become fouled with drippings and splatterings from the food processed. And, until recently there has been no transparent material which could be closely juxtaposed to an open flame without its destruction thereby. However, there is now available a "transparent glass-ceramic" that resists temperatures to 1470° F., a material with virtually zero thermal expansion and sufficient mechanical resistance as required for normal structural applications. Such a material is "ROBAX", a trademark, manufactured by Schott Glaswerke in Europe, and available from Schott America and its authorized dealers. It is an object of this invention to combine gas fired infra red radiants with light transmitting glass-ceramic liners in an oven broiler, whereby the food substance processed thereby is subjected to direct radiant heat.

Gas fired broilers and ovens necessarily involve the intake of air and the discharge of the products of combustion, and all of which results in convection flow thereof (forced or natural). It is an object of this invention to isolate the gas fired flow of gases from the cooking chamber, while venting the cooking chamber for the discharge of vapors developed as a result of high heat application to the food. With the present invention, there is a flue whoe's primary function is to discharge the products of combustion, and this flue also discharges the food vapors which are generated. In practice, the food processing chamber can be relatively small for specialized food processing, and is essentially a front opening tunnel vented at the rear to the aforesaid flue.

Broiler ovens are usually of rectangular cross section, having an interior comprised of top and bottom and opposite side walls. The broiler oven herein disclosed has top and bottom radiants, in which case there are top and bottom transparent walls isolating said top and bottom radiants from the food chamber. However, this arrangement is not to preclude side radiants in a larger broiler oven or the like where there are also side walls to isolate the side radiants from the food chamber. Therefore, it is an object of this invention to protect any and all radiants of an oven by isolating the same from the food chamber by means of transparent light transmitting walls; that is walls transmitting radiant heat energy and particularly infra-red light waves that directly heats the body of substance upon which it impinges.

Cleaning is an ever present problem with broiler ovens and the like, and the interior walls are usually coated metal which can be wiped clean and/or subjected to harsh cleaners. It is an object of this invention to provide a broiler oven interior which is inherently easy to cleam. With the present invention the glass-ceramic liner or liners are smooth with the hardness of glass or ceramic, and from which drippings and splatterings burn or brush off, or are readily wiped away. Cleaning is also facilitated by easy removal or replacement of the glass-ceramic walls in the form of panels or tiles.

Heretofore, screens have been used to bounce back a percentage of the infra-red waves, thus raising and maintaining the radiant temperature desired. Accordingly, it is an object of this invention to reflect a percentage of infra-red waves from the inside of the glass-ceramic wall or liner which is suitably spaced at an optimum distance form the radiant, thereby maintaining the desired radiant temperature. Therefore, a small amount of reflected light enhances radiant operation, while the greater amount of radiant light is transmitted through the glass-ceramic; and to this end the transparency of the glass-ceramic is selected as may be required.

SUMMARY OF THE INVENTION

This invention cooperatively relates in combination, infra-red radiants with light transmitting liners that isolate said radiants from a chamber in which foods are processed by radiation. Although heat radiation can be generated by other means such as electrical heating coils, it is the more efficient gas fired radiants which are preferred to be used here and which are described herein. Therefore, the radiants are supplied with air to support combustion, and the products of combustion are isolated from the cooking chamber, there being a common flue for both the radiants and said cooking chamber. It is a top and bottom radiant configuration which is of particular utility herein, whereby the food is simultaneously processed top and bottom. In this configuration the top and bottom radiants are both protected against drippings and splatterings from the food being processed, and are therefore not adversely affected by the cooking process. The light transmitting liners are of a glass-ceramic or the like, which is not adversely affected by the usual 1600° F. temperature at the surface of the radiants from which they are selectively spaced and thereby forming a glass protective flue plenum. The glass-ceramic employed can be subjected to 1470° F. without adverse effect. The food substances processed in this broiler oven are not subjected to direct flames but to direct radiation, and cannot be charred by flame. In practice also, the food substances are carried upon suitable racks and properly positioned thereby within the confines of the cooking chamber, into and from which the rack with the food substance can be easily inserted and removed. The front opening of the cooking chamber can be closed by a door when so desired.

The foregoing and various other objects and features of this invention will be apparent and fully understood from the following detailed description of the typical preferred form and application thereof, throughout which description reference is made to the accompanying drawings.

THE DRAWINGS

FIG. 2 is a sectional view taken as indicated by line 2—2 on FIG. 1.

FIG. 3 is an enlarged detailed fragmentary view of the burner radiant in its preferred form.

Figure 1:
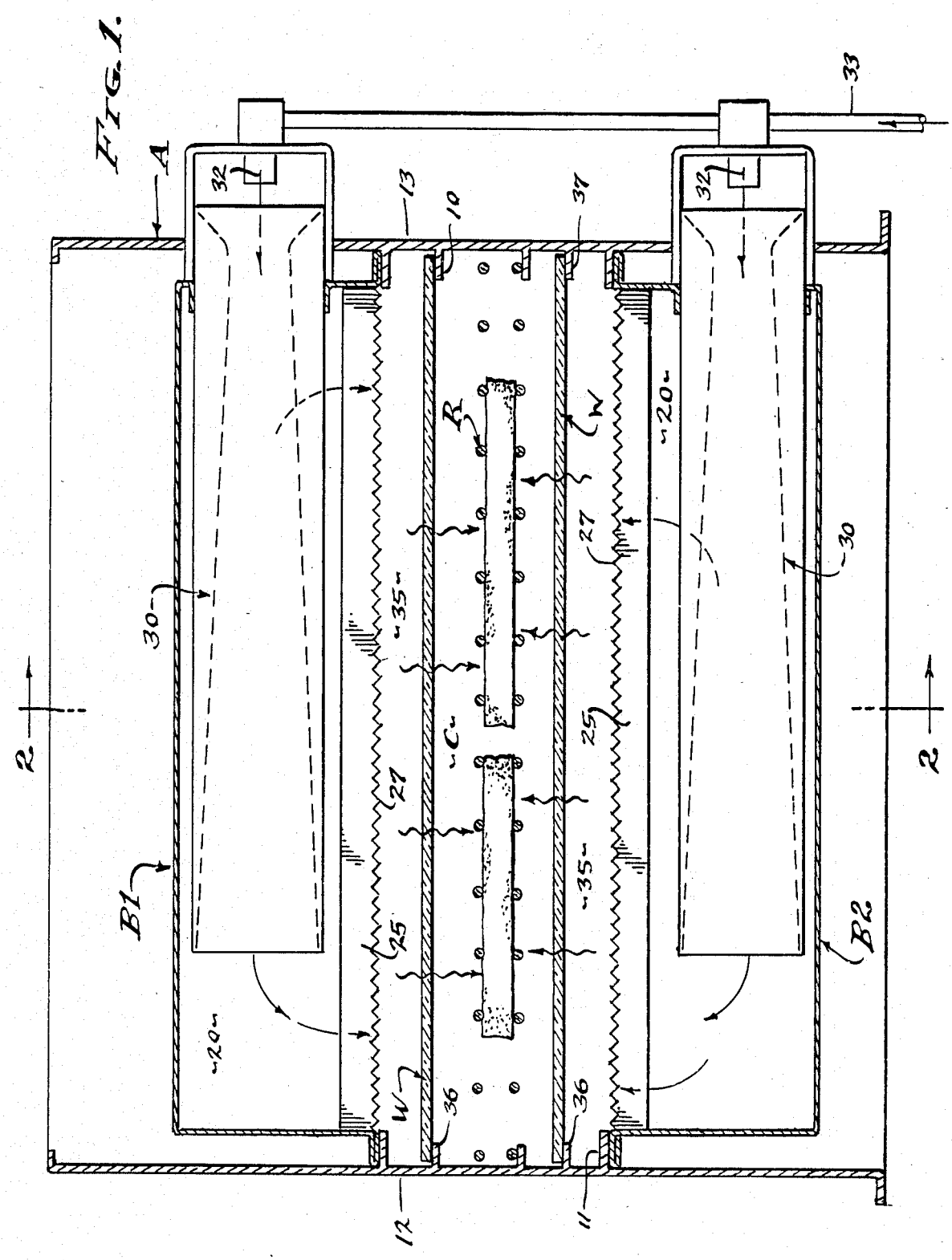
FIG. 1 is a transverse vertical sectional view of the Over And Under Radiant Broiler Oven of the present invention.

And, FIG. 4 is a plan view of the burner radiant surface plane and taken as indicated by line 4—4 on FIG. 3.

PREFERRED EMBODIMENT

Referring now to the drawings, the food processing oven shown herein is an over and under radiant broiler oven, for processing portions of food. Accordingly, the broiler oven shown and described has top and bottom burners B1 and B2 exposed through top and bottom frames 10 and 11 of an oven body A. The side walls 12 and 13 of the body are imperforate vertically disposed and parallel members that join the frames 10 and 11 disposed in spaced and parallel horizontal planes with the frames 10 and 11 in parallel alignment one with the other. The front of the oven body A is essentially open, though it can be closed with a door (not shown), while the back of the oven body A between the side walls 12 and 13 and between the top and bottom frames 10 and 11 is open to a flue 14. As shown, the flue 14 discharges upwardly by means of convection flow or the like. Accordingly, this broiler oven is front opening with a flue that closes the back thereof.

This oven can vary in its configuration and general purpose. For example, the sides 12 and 13 too can be frames for the exposure of burners into the oven interior. Or for example, the aforesaid front and back flue can also be framed for the exposure of the burners into the oven interior. Thus, it is feasible to have coextensive radiant heat applied to any or all sides of an oven interior.

The burners B1 and B2 are alike, one faced down through the frame 10 and the other faced up through the frame 11, preferably identical burners so that a description of one will suffice for both, or any like burners at the sides and/or front and back of the oven. The burners B1 and B2 are gas fired radiant burners with a plenum 20 that coextensively overlies the frame 10 or 11 to which it is attached. In practice, the burners B1 and B2 are rectangular and are exposed coextensively through top and bottom frames 10 and 11 and into the broiler oven chamber C. The coextensive frame opening of the plenum 20 is occupied or closed by a ceramic radiant 25 that is characterized by a multiplicity of burner ports 26 throughout its radiant area coextensively exposed into the oven chamber C. In practice, the radiant 25 is approximately ⅜ inch thick and the ports are approximately 0.050 inch diameter and spaced at approximately 0.120 inch one from the other. The diameters and spacing of said ports varies with different manufacturers and as circumstances require. Accordingly, the burners B1 and B2 are box shaped devices attached to and over the frames 10 and 11 to coextensively expose the radiants 25 into the top and bottom of the oven chamber.

A preferred surface configuration of the radiant is that which is characterized by an exposed surface comprised of a multiplicity of adjacent pyramids 27 between which rows of the aforesaid ports 26 extend both longitudinally and transversely. As shown, the pyramids 27 are four sided, inclined at 45°, with aligned valleys between adjacent pyramids to accomodate the rows of ports 26 extending both longitudinally and transversely. In practice, the base of each pyramid is 0.190 inch square, and the height is rounded off at about 0.100 inch. Accordingly, there is a port 26 at the base corner of each pyramid, and an intermediate port 26 therebetween. This particular radiant surface configuration is most efficient in its emission of radiant infra-red wave energy for the purpose of this invention in the cooking of food substances.

A predetermined and proper gas mixture is supplied to the plenum 20 by means of a jet pump 30 in the form of a venturi 31 opening from atmosphere and into the plenum 20, and supplied with a combustion gas through a controlling orifice 32. As shown, there is a pressured gas supply 33 to the orifice 32, and the orifice in each instance is axially aligned with and discharges at the venturi opening and into said venturi which draws outside air for pressured discharge into the plenum 20. A feature of this jet pump cumbustible gas supply is that is provides a 100% complete combustible mixture comprised of gas and primary combustion air; no secondary combustion air being required. Accordingly, the plenum 20 is supplied with a complete combustible mixture for discharge through the multiplicity of combustion ports 26. A feature of these radiants is that they operate most satisfactorily in any disposition, face up or down, or at any angle. Another feature is the phenomenon similar to that of a Bunsen burner, wherein the flame is confined to the exposed outside of the multiplicity of small port openings. In practice, the height of the flames does not exceed but a few diameters of the ports from which they emanate, more or less. Accordingly, when the burners B1 and B2 are lighted, they produce a coextensive sheet of flame that uniformly heats the entire surface of the radiant to a consistantly high temperature (800° F. to 1600° F.) as controlled by the orifice.

The gas burners B1 and B2 hereinabove described are referred to as infra-red radiants, since their effect is to radiate heat waves of longer wavelength than those of visible light. The radiant 25 is a ceramic body which quickly absorbs heat from the multiplicity of flames within and emanating from the closely related combustion ports 26, the flame-to-ceramic contact area being large by virtue of the multiplicity of ports. As a result, the entire surface area of the radiant 25 is covered by a sheet of flames which intensely heats the exposed radiant surface to approximately 1600° F. within the infra-red energy range. Consequently, infra-red heat waves are emitted from the entire radiant surface faced into the oven chamber C in accordance with this invention. These infra-red heat energy waves are known to diminish with the cosine of the angle to the plane of the radiant surface and at a rate determined by the square of the distance from said radiant surface. Therefore, both the food substance to be processed and the protecting transparent wall W next described must be properly placed in accordance with this invention.

In accordance with this invention, I provide a transparent wall W between the burner radiant and the food being processed in order to prevent drippings and splatterings from interfering with operation of the burner. This is a decided improvement with respect to both the upper and lower burners B1 and B2, and especially the lower burner B2 which is normally subjected to a profuse amount of drippings and splatterings of juices, grease etc. The transparent wall W is spaced from and is coextensive with the radiant surface plane area, from which the heat wave energy is emitted, leaving a space therebetween which is the flue plenem 35 for discharging of the products of combustion. In practice, the transparent wall W is spaced ½ to ⅝ inch, more or less, from the pyramid tops of the radiant surface, a distance sufficient in each instance to reduce surface temperature at the wall W to a tolerable level thereof. The flue plenum 35 is open at the back into the flue 14, and as shown it is open at the front for induction of draft air for convection flow into said flue. In practice, the top combination of radiant burner B1 and transparent wall W is the same as the construction of the bottom combination of radiant burner B2 and transparent wall W, the radiant burners B1 and B2 being faced toward and into the oven chamber C.

The transparent walls W are supported within the oven body A upon rails 36 or the like. Since the surrounding metal structure has a substantially high coefficient of expansion as compared to the substantially zero coefficient of expansion of the glass-ceramic wall used herein, the support of said walls W is loose. That is, the transparent walls W are free to simply rest in place upon the rails. However, they can be positively positioned if so desired. In practice, the transparent walls W are flat liners, panels or tiles of the high temperature resistant glass ceramic, having smooth surfaces adapted to easy cleaning and for the transmission of the infra-red light. A small portion of the infra-red waves is reflected and thereby enhances the heat absorption into the ceramic of the radiant. This reflection also enhances the combustion environment, by intensifying the same, so as to ensure the absence of CO. However, the greater portion of the infra-red heat waves is transmitted through the transparent wall W to be absorbed into the food substance being processed. A high heat resistant transparent glass-ceramic which has been used in successfully carrying out this invention is "ROBAX", a trademark of Schott Glaswerke in Europe, and available from Schott America and its authorized distributers. This high heat resistant material can presently withstand a temperature of 1470° F. without any adverse affect, and the aforesaid selected spacing of the transparent window W from the radiant plane of infra-red emission adjusts the temperature at the plane of the transparent wall W so that it is within a tolerable range, all as circumstances require.

From the foregoing it will be understood how the burner radiants are protected, for prolonged and efficient operation, by a transparent wall spaced from the burner radiant and for control of the wall surface temperature at a tolerable level, while transmitting radiant heat waves to an oven interior where the waves are absorbed into the food substance. Fuel gas and primary air alone are used for combustion at the exposed surface of the burner, which burner becomes radiant thereby. The transparent window defines a flue plenum that separates combustion from the oven interior, and so that processing of food substances is entirely by infra-red radiation, the oven interior being open to the flue for normal ventilation whether closed or open at is front opening. As shown, a rack R is employed to hold and positionably support the food substance within the confines of the oven chamber C for its processing. The rack R is supported within the oven body A upon rails 37 at the opposite side walls.

Having described only the typical preferred forms and applications of my invention, I do not wish to be limited or restricted to the specific details herein set forth, but wish to reserve to myself any modifications of variations that may appear to those skilled in the art as set forth within the limits of the following claims.

I claim:

1. A radiant broiler oven including in combination;
   an oven body defining an oven chamber therein and having at least one side wall with a frame opening into the oven chamber,
   a burner means radiating infra-red heat waves from a surface plane thereof and supported by the frame with said surface plane exposed into the oven chamber,
   and a transparent liner of high heat resistant material coextensive with the surface plane of the burner means to transmit the infra-red waves therefrom and into the oven chamber.

2. The radiant broiler oven combination as set forth in claim 1, wherein the transparent liner is of a high heat resistant glass-ceramic.

3. The radiant broiler oven combination as set forth in claim 1, wherein the transparent liner is spaced a distance from and parallel to the surface plane of the burner means to reduce heat at the liner to a tolerable level.

4. The radiant broiler oven combination as set forth in claim 1, wherein the transparent liner is of a high heat resistant glass ceramic spaced a distance from and parallel to the surface plane of the burner means to reduce heat at the liner to a tolerable level.

5. The radiant broiler oven combination as set forth in claim 1, wherein a food bearing rack is supported within the oven body in spaced relation to the surface plane of the burner means and from said liner.

6. A radiant broiler oven including in combination;
an oven body defining an oven chamber therein and having a flue therefrom and with at least one side wall with a frame opening into the oven chamber,
a gas fired burner means radiating infra-red heat waves from a surface plane thereof and supported by the frame with said surface plane exposed into the oven chamber,
and a transparent liner of high heat resistant material coextensive with and spaced from the surface plane of the burner means and forming a flue plenum opening into the first mentioned flue from the oven chamber for discharging products of combustion while simultaneously isolating the burner means from the oven chamber and atransmitting the infra-red heat waves therefrom and into the oven chamber.

7. The radiant broiler oven combination as set forth in claim 6, wherein the transparent liner is of a high heat resistant glass-ceramic.

8. The radiant broiler oven combination as set forth in claim 6, wherein the transparent liner is spaced a distance from and parallel to the surface plane of the burner means to reduce heat at the liner to a tolerable level.

9. The radiant broiler oven combination as set forth in claim 6, wherein the transparent liner is of a high heat resistant glass-ceramic spaced a distance from and parallel to the surface plane of the burner means to reduce heat at the liner to a tolerable level.

10. The radiant broiler oven combination as set forth in claim 6, wherein the flue plenum opens at one side of the oven body for the induction of air between the surface plane of the burner means and liner spaced therefrom and for subsequent discharge with the products of combustion.

11. The radiant broiler oven combination as set forth in claim 6, wherein the transparent liner is of high heat resistant glass-ceramic spaced a distance from and parallel to the surface plane of the burner to reduce heat at the liner to a tolerable level, and wherein the flue plenum opens at one side of the oven body for the induction of air between the surface plane of the burner means and liner spaced therefrom and for subsequent discharge with the products of combustion.

12. The radiant broiler oven combination as set forth in claim 6, wherein a food bearing rack is supported within the oven body in spaced relation to the surface plane of the gas firied burner means and from the liner.

13. An over and under radiant broiler oven including in combination;
an oven body defining an oven chamber therein and having top and bottom frames extending between side walls and opening into the oven chamber,
top and bottom burner means and each radiating infra-red heat waves from a surface plane thereof and supported by the top and bottom frames respectively and with said surface planes thereof exposed into the oven chamber,
and top and bottom transparent liners of high heat resistant materiial coextensive with the surface planes of the top and bottom burner means respectively to transmit the infra-red heat waves therefrom and into the oven chamber.

14. The radiant broiler oven combination as set forth in claim 13, wherein the transparent liners are of a high heat resistant glass-ceramic.

15. The radiant broiler oven combination as set forth in claim 13, wherein the transparent liners are spaced a distance from and parallel to the surface planes of the burner means to reduce heat at the liners to a tolerable level.

16. The radiant broiler oven combination as set forth in claim 13, wherein the transparent liners are of a high heat resistant glass-ceramic spaced a distance from and parallel to the surface planes of the burner means to reduce heat at the liner to a tolerable level.

17. The radiant broiler oven combination as set forth in claim 13, wherein a food bearing rack is supported within the oven body in spaced relation to the surface planes of the top and bottom burner means and from the liners.

18. An over and under radiant broiler oven including in combination;
an oven body defining an oven chamber therein and having a flue therefrom and with top and bottom frames extending between side walls and opening into the oven chamber,
top and bottom gas fired burner means and each radiating infra-red heat waves from a surface plane thereof and supported by the top and bottom frames respectively and with said surface planes thereof exposed into the oven chamber,
and top and bottom transparent liners of high heat resistant material coextensive with the surface planes of the top and bottom burner means respectively and spaced from the surface planes of the top and bottom burner means and forming top and bottom flue plenums opening into the first mentioned flue from the oven chamber for discharging products of combustion while simultaneously isolating the burner means from the oven chamber and transmitting the infra-red heat waves therefrom and into the oven chamber.

19. The radiant broiler oven combination as set forth in claim 18, wherein the transparent liners are of a high heat resistant glass-ceramic.

20. The radiant broiler oven combination as set forth in claim 18, wherein the transparent liners are spaced a distance from and parallel to the surface planes of the burner means to reduce heat at the liners to a tolerable level.

21. The radiant broiler oven combination as set forth in claim 18, wherein the transparent liners are of high heat resistant glass-ceramic spaced a distance from and parallel to the surface planes of the burner means to reduce heat at the liners to a tolerable level.

22. The radiant broiler oven combination as set forth in claim 18, wherein the flue plenums open at one side of the oven body for the induction of air between the surface planes of the burner means and liners spaced therefrom and for subsequent discharge with the products of combustion.

23. The radiant broiler oven combination as set forth in claim 18, wherein the transparent liners are of high heat resistant glass-ceramic spaced a distance from and parallel to the surface planes of the burner means to reduce heat at the liners to a tolerable level, and wherein the flue plenums open at one side of the oven body for the induction of air between the surface plane of the burner means and liners spaced therefrom and for subsequent discharge with the products of combustion.

24. The radiant broiler oven combination as set forth in claim 18, wherein a food bearing rack is supported within the oven body in spaced relation to the surface planes of the top and bottom gas fired burner means and from the liners.

* * * * *